US010832898B2

(12) United States Patent
Green et al.

(10) Patent No.: US 10,832,898 B2
(45) Date of Patent: Nov. 10, 2020

(54) METHOD OF DATA DEPENDENT CONTROL (71) Applicant: Micromass UK Limited, Wilmslow (GB)

(72) Inventors: Martin Raymond Green, Bowdon (GB); Keith Richardson, Derbyshire (GB)

(73) Assignee: Micromass UK Limited, Wilmslow (GB)

( * ) Notice: Subject to any disclaimer, the term of this patent is extended or adjusted under 35 U.S.C. 154(b) by 734 days.

(21) Appl. No.: 14/774,820

(22) PCT Filed: Mar. 14, 2014

(86) PCT No.: PCT/GB2014/050802
§ 371 (c)(1),
(2) Date: Sep. 11, 2015

(87) PCT Pub. No.: WO2014/140622
PCT Pub. Date: Sep. 18, 2014

(65) Prior Publication Data
US 2016/0027628 A1 Jan. 28, 2016

(30) Foreign Application Priority Data

Mar. 14, 2013 (EP) .................................. 13159167.9
Mar. 14, 2013 (GB) .................................. 1304588.5

(51) Int. Cl.
*H01J 49/00* (2006.01)
*H01J 49/02* (2006.01)
*G06F 17/18* (2006.01)

(52) U.S. Cl.
CPC .......... *H01J 49/0036* (2013.01); *G06F 17/18* (2013.01); *H01J 49/025* (2013.01)

(58) Field of Classification Search
None
See application file for complete search history.

(56) References Cited

U.S. PATENT DOCUMENTS 5,559,325 A * 9/1996 Franzen .............. H01J 49/4265
250/282
5,572,022 A * 11/1996 Schwartz .............. H01J 49/147
250/282

(Continued)

FOREIGN PATENT DOCUMENTS

DE 3430984 A1 * 3/1986 ............ H01J 49/025
DE 3430984 A1 * 3/1986 ............ H01J 49/025

(Continued)

OTHER PUBLICATIONS

Translation of Japanese Notification of Refusal dated Jan. 9, 2018.

*Primary Examiner* — Andrew Smyth
(74) *Attorney, Agent, or Firm* — Diederiks & Whitelaw, PLC.

(57) ABSTRACT

A method of mass spectrometry is disclosed comprising obtaining first data at a first time and/or location and second data at a second subsequent time and/or location. A future trend or rate of change in the data is predicted from the first and second data. An attenuation factor of an attenuation device is adjusted in response to the predicted future trend or rate of change in the data so as to maintain operation of a detector or detector system within the dynamic range of the detector or detector system and/or to prevent saturation of the detector or detector system.

16 Claims, 3 Drawing Sheets (56) References Cited

U.S. PATENT DOCUMENTS

| | | | | |
|---|---|---|---|---|
| 5,936,241 A * | 8/1999 | Franzen | ............... | H01J 49/4265 250/282 |
| 6,627,876 B2 * | 9/2003 | Hager | ................. | H01J 49/4225 250/282 |
| 7,047,144 B2 * | 5/2006 | Steiner | ................ | H01J 49/0027 702/64 |
| 7,238,936 B2 * | 7/2007 | Okamura | ............. | H01J 49/025 250/284 |
| 7,391,016 B2 * | 6/2008 | Belgovskiy | ............ | G01N 30/86 250/282 |
| 8,502,137 B2 * | 8/2013 | Grothe | ................ | H01J 49/0036 250/282 |
| 8,680,461 B2 * | 3/2014 | Rardin | ................ | H01J 49/0031 250/282 |
| 9,129,781 B2 * | 9/2015 | Richardson | ......... | H01J 49/0027 |
| 9,177,765 B2 * | 11/2015 | Olney | ................. | H01J 49/0031 |
| 2010/0042334 A1 * | 2/2010 | Rardin | .................... | H01J 49/02 702/27 |
| 2012/0046872 A1 * | 2/2012 | Kuhn | ..................... | G16B 30/00 702/19 |

FOREIGN PATENT DOCUMENTS

| | | | | |
|---|---|---|---|---|
| EP | 0172477 A2 * | 2/1986 | ............ | H01J 49/025 |
| EP | 0172477 A3 * | 1/1987 | ............ | H01J 49/025 |
| GB | 1484742 | 9/1977 | | |
| JP | S6159246 | 3/1986 | | |
| JP | 61059246 U * | 4/1986 | | |
| JP | 61059246 B * | 12/1986 | | |
| JP | 2005025946 | 1/2005 | | |
| JP | 2005025946 A * | 1/2005 | | |

* cited by examiner

METHOD OF DATA DEPENDENT CONTROL

CROSS-REFERENCE TO RELATED APPLICATION

This application is the National Stage of International Application No. PCT/GB2014/050802, filed 14 Mar. 2014 which claims priority from and the benefit of United Kingdom patent application No. 1304588.5 filed on 14 Mar. 2013 and European patent application No. 13159167.9 filed 14 Mar. 2013. The entire contents of these applications are incorporated herein by reference.

BACKGROUND OF THE PRESENT INVENTION

The present invention relates to a method of mass spectrometry and a mass spectrometer.

In many applications very complex mixtures of compounds are analysed. Individual components within these mixtures are present with a wide range of relative concentrations and may be in the presence of large concentrations of matrix or endogenous background signals. This gives rise to a wide range of ion current intensities transmitted to the mass analyser and on to the ion detector. For many of these applications it is important to produce quantitative and qualitative data (in the form of exact mass measurement) for as many specific target analytes as possible. This puts very high demands on the dynamic range of the ion source, mass analyser and detection system employed in the mass spectrometer.

A known method of controlling the intensity of an ion signal is to adjust the transmission or sensitivity of the mass spectrometer or the gain of an electron multiplier (attenuation) to keep the largest ion within a specific mass to charge ratio range within the dynamic range of the ion detection system. This may be the base peak within a whole spectrum or a specific mass to charge ratio value in a targeted analysis. In this case it may not matter that signals from other mass to charge ratio values exceed the dynamic range of the detection system as long as they are separated from the target of interest.

In conventional systems a current spectrum (which may be in the form of a short pre-scan) may be used to judge the amount by which a subsequent spectrum should be attenuated. It is assumed that the charge density of the ion beam generated by the ion source will be unchanged in the time period between recording and interrogating the current data and recording a subsequent data set. Therefore, it is assumed that the intensity of a target signal in a subsequent spectrum will be substantially the same as the intensity of the current spectrum.

No attempt is made to predict the likely change in intensity based upon the previous behaviour of the signal from previously recorded data sets.

U.S. Pat. No. 7,047,144 (Steiner) discloses a method where the gain of an electron multiplier is adjusted based on a current spectrum to ensure that the intensity of a target peak is within defined limits.

U.S. Pat. No. 5,572,022 (Schwartz) discloses a method of controlling the ion population in an ion trap using data from a current scan.

U.S. Pat. No. 6,627,876 (Hagar) and U.S. Pat. No. 6,987,261 (Horning) describe different approaches to generating a current scan but only use data from the current scan to predict the amount of attenuation for a subsequent scan. The fill time of an ion trap is used to attenuate the signal in a final mass spectrum.

Automatic control of ion trap filling time in one form or another in used on commercial RF and electrostatic ion traps.

U.S. 2012/046872 (Kühn) discloses a database-supported online de novo method of sequencing biopolymers. The mass to charge ratio of fragment ions is determined and the mass differences Δm between the fragment ions is presented in a matrix as shown in FIG. 6. A database is interrogated and the database may include previously calculated measurement data including mass differences between monopolymers and polymers of the biopolymers. The disclosed method in relation to unelucidated sequence parts determines precursor ions for further fragmentation.

WO 2013/081581 (Olney) discloses a method of automatically checking and adjusting the calibration of a mass spectrometer. With reference to FIG. 2A a calibration check 311 may be performed wherein the collision energy of a collision cell Q2 is reduced to zero and parent ions are mass analysed without being subjected to fragmentation. A determination 318 is then made as to whether the peak centroid position and peak width etc. are within expectations based upon a previous calibration. If drift from expected values is not negligible then the method passes to a step 324 wherein a data quality score is calculated. In a step 326 a determination is made as to whether the mass calibration or resolution has drifted to such an extent that a recalibration procedure is necessary. If immediate re-calibration is not necessary then the degree of deviation of measured results from the expected values may be used in a step 326 to monitor or provide a record of the degree of deviation over time to predict when in the future recalibration or system cleaning will be necessary.

GB-2489110 (Micromass) discloses with reference to FIG. 2 an arrangement comprising an ion mobility separation device, an attenuation device and a Time of Flight mass analyser. Ions are subjected to a two dimensional separation and ions having a particular ion mobility and a particular mass to charge ratio are selectively attenuated.

U.S. 2006/020400 (Okamura) discloses a detector assembly having a current measuring device with a saturation threshold level.

It is desired to provide an improved method of mass spectrometry and an improved mass spectrometer.

SUMMARY OF THE PRESENT INVENTION

According to an aspect of the present invention there is provided a method of mass spectrometry comprising:

obtaining first data at a first time and/or location and second data at a second subsequent time and/or location;

predicting a future trend or rate of change in the data from the first and second data; and adjusting an attenuation factor of an attenuation device or otherwise adjusting the transmission of ions in response to the predicted future trend or rate of change in the data so as to maintain operation of a detector or detector system within the dynamic range of the detector or detector system and/or to prevent saturation of the detector or detector system.

Others embodiments of the present invention are contemplated comprising obtaining first data at a first time and/or location and second data at a second subsequent time and/or location and predicting a future trend or rate of change in the data from the first and second data. The method then preferably comprises adjusting the ionisation efficiency of an ionisation or ion source and/or adjusting the gain of an ion detector or ion detection system.

It will be understood that the present invention is not limited to obtaining just first and second data and predicting a future trend or rate of change solely from just first and second data. Embodiments of the present invention are contemplated wherein in addition to first and second data, third, fourth, fifth, sixth, seventh, eighth, ninth, tenth or further data are preferably obtained and the third, fourth, fifth, sixth, seventh, eighth, ninth, tenth or further data are preferably used in addition to the first and second data in order to predict a future trend or rate of change in the data.

The method according to the preferred embodiment adapts to changes in the rate of change of intensity of the signal delivered to a mass spectrometer. This provides more appropriate control of an attenuation or other device compared to known arrangements where it is assumed that the intensity will not change significantly from the intensity measured in the current data set in the time required to acquire a subsequent data set. However, this is not the case particularly when the signal intensity is rising rapidly with respect to the frequency of the spectral acquisition rate.

The preferred embodiment provides an improved method of determining the attenuation value required by using information from previously acquired data, which may or may not include the current data, to predict the intensity which is expected in a subsequent spectra and hence to set an attenuation value appropriate for the predicted intensity prior to the data being acquired.

For example, as an analyte elutes from a chromatographic column or from an ion mobility spectrometer or separator ("IMS") drift tube the rate of change of intensity over a number of previously acquired data points may be used to predict the subsequent intensity at a future time. This may be by means of a simple linear extrapolation or a more complex function based on the known characteristics of the mass spectrometer or chromatographic technique.

The preferred method provides a more accurate determination of the attenuation factor (or other change in an operational parameter) required than conventional methods which do not attempt to predict a future trend in a measurement e.g. the rate at which the intensity of analyte ions of interest are increasing with time.

The method according to the preferred embodiment results in less likelihood of over attenuation of the data which would result in reducing sensitivity unnecessarily.

The preferred method also allows the control system to adapt to different rates of change thereby reducing the likelihood of under attenuation causing corruption of data. Under attenuation may occur when the rate of change of the charge density in the ion beam is such that the intensity in a subsequently recorded scan is significantly higher than the intensity in the current scan. The method according to the preferred embodiment has the advantage that it adapts to the different rates of change of intensity which occur in mass spectrometry.

U.S. 2012/046872 (Kühn) discloses predicting unelucidated parts of a sequence but this should not be construed as predicting a future trend or rate of change from first and second data within the meaning of the present invention. Furthermore, U.S. 2012/046872 (Kühn) does not disclose adjusting an attenuation factor of an attenuation device or otherwise adjusting the transmission of ions in response to the predicted future trend or rate of change in the data so as to maintain operation of a detector or detector system within the dynamic range of the detector or detector system and/or to prevent saturation of the detector or detector system.

WO 2013/081581 (Olney) discloses comparing observed and expected performance but this should not be construed as predicting a future trend or rate of change in first and second data within the meaning of the present invention. Furthermore, WO 2013/081581 (Olney) does not disclose adjusting an attenuation factor of an attenuation device or otherwise adjusting the transmission of ions in response to the predicted future trend or rate of change in the data so as to maintain operation of a detector or detector system within the dynamic range of the detector or detector system and/or to prevent saturation of the detector or detector system.

The first and second data preferably comprise mass spectral data.

The first and second data preferably comprise multi-dimensional data.

The first and second data preferably relate to two or more physico-chemical properties of ions.

The two or more physico-chemical properties preferably comprise mass, mass to charge ratio, time of flight, ion mobility, differential ion mobility, retention time, liquid chromatography retention time, gas chromatography retention time or capillary electrophoresis retention time.

According to an aspect of the present invention there is provided a mass spectrometer comprising:

a control system arranged and adapted:

(i) to obtain first data at a first time and/or location and second data at a second subsequent time and/or location;

(ii) to predict a future trend or rate of change in the data from the first and second data; and (iii) to adjust an attenuation factor of an attenuation device or otherwise adjust the transmission of ions in response to the predicted future trend or rate of change in the data so as to maintain operation of a detector or detector system within the dynamic range of the detector or detector system and/or to prevent saturation of the detector or detector system.

The first and second data preferably comprise mass spectral data.

The first and second data preferably comprise multi-dimensional data.

The first and second data preferably relate to two or more physico-chemical properties of ions.

The two or more physico-chemical properties preferably comprise mass, mass to charge ratio, time of flight, ion mobility, differential ion mobility, retention time, liquid chromatography retention time, gas chromatography retention time or capillary electrophoresis retention time.

The step of adjusting an attenuation factor of an attenuation device preferably comprises repeatedly switching an attenuation device between a first mode of operation for a time period $\Delta T_1$ wherein the ion transmission is substantially 0% and a second mode of operation for a time period $\Delta T_2$ wherein the ion transmission is >0%.

The step of adjusting the attenuation factor of the attenuation device preferably comprises adjusting the mark space ratio $\Delta T_2/\Delta T_1$ in order to adjust or vary the transmission or attenuation of the attenuation device.

The method preferably further comprises switching between the first mode of operation and the second mode of operation with a frequency of: (i) <1 Hz; (ii) 1-10 Hz; (iii) 10-50 Hz; (iv) 50-100 Hz; (v) 100-200 Hz; (vi) 200-300 Hz; (vii) 300-400 Hz; (viii) 400-500 Hz; (ix) 500-600 Hz; (x) 600-700 Hz; (xi) 700-800 Hz; (xii) 800-900 Hz; (xiii) 900-1000 Hz; (xiv) 1-2 kHz; (xv) 2-3 kHz; (xvi) 3-4 kHz; (xvii) 4-5 kHz; (xviii) 5-6 kHz; (xix) 6-7 kHz; (xx) 7-8 kHz; (xxi) 8-9 kHz; (xxii) 9-10 kHz; (xxiii) 10-15 kHz; (xxiv) 15-20 kHz; (xxv) 20-25 kHz; (xxvi) 25-30 kHz; (xxvii)

30-35 kHz; (xxviii) 35-40 kHz; (xxix) 40-45 kHz; (xxx) 45-50 kHz; and (xxxi) >50 kHz.

According to an embodiment $\Delta T_1 > \Delta T_2$. According to another embodiment $\Delta T_1 \leq \Delta T_2$.

The time period $\Delta T_1$ is preferably selected from the group consisting of: (i) <0.1 μs; (ii) 0.1-0.5 μs; (iii) 0.5-1 μs; (iv) 1-50 μs; (v) 50-100 μs; (vi) 100-150 μs; (vii) 150-200 μs; (viii) 200-250 μs; (ix) 250-300 μs; (x) 300-350 μs; (xi) 350-400 μs; (xii) 400-450 μs; (xiii) 450-500 μs; (xiv) 500-550 μs; (xv) 550-600; (xvi) 600-650 μs; (xvii) 650-700 μs; (xviii) 700-750 μs; (xix) 750-800 μs; (xx) 800-850 μs; (xxi) 850-900 μs; (xxii) 900-950 μs; (xxiii) 950-1000 μs; (xxiv) 1-10 ms; (xxv) 10-50 ms; (xxvi) 50-100 ms; and (xxvii) >100 ms.

The time period $\Delta T_2$ is preferably selected from the group consisting of: (i) <0.1 μs; (ii) 0.1-0.5 μs; (iii) 0.5-1 μs; (iv) 1-50 μs; (v) 50-100 μs; (vi) 100-150 μs; (vii) 150-200 μs; (viii) 200-250 μs; (ix) 250-300 μs; (x) 300-350 μs; (xi) 350-400 μs; (xii) 400-450 μs; (xiii) 450-500 μs; (xiv) 500-550 μs; (xv) 550-600; (xvi) 600-650 μs; (xvii) 650-700 μs; (xviii) 700-750 μs; (xix) 750-800 μs; (xx) 800-850 μs; (xxi) 850-900 μs; (xxii) 900-950 μs; (xxiii) 950-1000 μs; (xxiv) 1-10 ms; (xxv) 10-50 ms; (xxvi) 50-100 ms; and (xxvii) >100 ms.

The attenuation device preferably comprises one or more electrostatic lenses.

In the first mode of operation a voltage is preferably applied to one or more electrodes of the attenuation device, wherein the voltage causes an electric field to be generated which acts to retard and/or deflect and/or reflect and/or divert a beam of ions.

The step of adjusting the attenuation factor of the attenuation device preferably comprises controlling the intensity of ions which are onwardly transmitted by the attenuation device by repeatedly switching the attenuation device ON and OFF, wherein the duty cycle of the attenuation device may be varied in order to control the degree of attenuation of the ions.

According to an aspect of the present invention there is provided a method of mass spectrometry comprising:

obtaining first data at a first time and/or location and second data at a second subsequent time and/or location;

predicting a future trend or rate of change in the data from the first and second data; and adjusting an operational parameter of a mass spectrometer in response to the predicted future trend or rate of change.

The first and second data preferably comprises mass spectral data.

The first and second data preferably comprise multi-dimensional data.

The first and second data preferably relate to two or more physico-chemical properties of ions.

The two or more physico-chemical properties preferably comprise mass, mass to charge ratio, time of flight, ion mobility, differential ion mobility, retention time, liquid chromatography retention time, gas chromatography retention time or capillary electrophoresis retention time.

The step of adjusting an operational parameter of a mass spectrometer in response to the predicted future trend or rate of change further preferably comprises seeking to maintain a desired performance of the mass spectrometer within a desired range.

The step of seeking to maintain a desired performance of the mass spectrometer within a desired range preferably comprises seeking to maintain the intensity, mass to charge ratio peak width, mass to charge ratio, a measure of the extent of saturation of an acquisition device or detection system or an ion mobility peak width or drift time within a desired range.

The performance of the mass spectrometer preferably comprises comprise mass measurement accuracy, detector or detection system saturation, maximum data rate, quantitative performance, mass resolution, ion mobility separation resolution, space charge induced mass or resolution shift, mass calibration or ion mobility separation calibration.

The operational parameter preferably comprises transmission of the mass spectrometer, efficiency of ionisation, gain of an ion detection system, the duty cycle of the mass spectrometer, the fill time of an ion trap, an adjustment of the extent of fragmentation of ions, an adjustment of the fluence or power of a laser or other excitation source, or mass to charge ratio calibration.

According to another aspect of the present invention there is provided a mass spectrometer comprising:

a control system arranged and adapted:

(i) to obtain first data at a first time and/or location and second data at a second subsequent time and/or location;

(ii) to predict a future trend or rate of change in the data from the first and second data; and (iii) to adjust an operational parameter of the mass spectrometer in response to the predicted future trend or rate of change.

According to an aspect of the present invention there is provided a method of mass spectrometry comprising:

(i) setting a desired measured target intensity $I_t$ of an ion beam or ion signal;

(ii) attenuating an ion beam or ion signal by an attenuation factor;

(iii) measuring the intensity $I_1$ of the attenuated ion beam or ion signal at a time $t_1$;

(iv) calculating a predicted future intensity of the attenuated ion beam or ion signal at a subsequent time $t_2$; and (v) adjusting the attenuation factor so that when the intensity $I_2$ of the attenuated ion beam or ion signal is measured at the subsequent time $t_2$ then the intensity $I_2$ of the attenuated ion beam or ion signal will substantially equal the target intensity $I_t$.

The method preferably further comprises prior to step (iii) measuring the intensity $I_0$ of the attenuated ion beam or ion signal at an earlier time t0, wherein t0<t1.

The step of calculating the predicted future intensity at the subsequent time $t_2$ preferably comprises using a linear extrapolation based upon at least the measured intensity $I_0$ at the time $t_0$ and the measured intensity $I_1$ at the time $t_1$.

The linear extrapolation is preferably further based upon one, two, three, four or more then four other intensity values other than $I_0$ and $I_1$.

According to another aspect of the present invention there is provided a mass spectrometer comprising:

a control system arranged and adapted:

(i) to set a desired measured target intensity $I_t$ of an ion beam or ion signal;

(ii) to attenuate an ion beam or ion signal by an attenuation factor;

(iii) to measure the intensity $I_1$ of the attenuated ion beam or ion signal at a time $t_1$;

(iv) to calculate a predicted future intensity of the attenuated ion beam or ion signal at a subsequent time $t_2$; and (v) to adjust the attenuation factor so that when the intensity $I_2$ of the attenuated ion beam or ion signal is measured at the subsequent time $t_2$ then the intensity $I_2$ of the attenuated ion beam or ion signal will substantially equal the target intensity $I_t$.

According to another aspect of the present invention there is provided a method of mass spectrometry comprising:

attenuating an ion beam or ion signal by an attenuation factor;

determining or predicting a future trend or rate of change in the intensity of the ion beam or ion signal; and adjusting the attenuation factor in response to the predicted future trend or rate of change.

The method preferably further comprises setting a desired target intensity for the ion beam or ion signal, wherein the step of adjusting the attenuation factor in response to the predicted future trend or rate of change comprises adjusting the attenuation factor so that a future measured intensity of the ion beam or ion signal having been adjusted by the attenuation factor substantially corresponds with the target intensity.

According to another aspect of the present invention there is provided a mass spectrometer comprising:

an attenuation device arranged and adapted to attenuate an ion beam or an ion signal by an attenuation factor; and a control system arranged and adapted:

(i) to determine or predict a future trend or rate of change in the intensity of the ion beam or ion signal; and (ii) to adjust the attenuation factor in response to the predicted future trend or rate of change.

The control system is preferably further arranged and adapted:

(i) to set a desired target intensity for the ion beam or ion signal; and (ii) to adjust the attenuation factor in response to the predicted future trend or rate of change so that a future measured intensity of the ion beam or ion signal having been adjusted by the attenuation factor substantially corresponds with the target intensity.

According to another aspect of the present invention there is provided a method of mass spectrometry comprising:

attenuating an ion beam or ion signal by an attenuation factor to avoid saturating an ion detector or adversely affecting a component of a mass spectrometer;

determining or predicting a rate of change in the intensity of the ion beam or ion signal; and adjusting the attenuation factor in response to the determined or predicted rate of change in intensity.

According to another aspect of the present invention there is provided a mass spectrometer comprising:

an attenuation device arranged and adapted to attenuate an ion beam or an ion signal by an attenuation factor to avoid saturating an ion detector or adversely affecting a component of a mass spectrometer; and a control system arranged and adapted:

(i) to determine or predict a rate of change in the intensity of the ion beam or ion signal; and (ii) to adjust the attenuation factor in response to the determined or predicted rate of change in intensity.

According to an aspect of the present invention there is provided a method of mass spectrometry comprising:

storing or recording in memory two or more arrays of data;

calculating a predicted characteristic of a future data set based on a trend in the two or more stored data; and adjusting one or more operating parameters of a mass spectrometer or device external to the mass spectrometer based on the predicted characteristic such that a feature of the mass spectrometer performance is maintained within a predetermined range.

Preferably, the array of data comprising mass spectral data and/or the array of data comprises a multi-dimensional data set.

The predicted characteristic may comprise intensity, mass to charge ratio peak width, mass to charge ratio, a measure of the extent of saturation of an acquisition device or detection system or an ion mobility peak width.

The operating parameter changed may comprise either transmission of the mass spectrometer, efficiency of ionisation, gain of the ion detection system, the duty cycle of the mass spectrometer, the fill time of an ion trap, an adjustment of the extent of fragmentation of ions, an adjustment of the fluence or power of a laser or other excitation source or mass to charge ratio calibration.

The performance feature of the mass spectrometer to be maintained may comprise mass measurement accuracy, detector or detection system saturation, maximum data rate, quantitative performance, mass resolution, IMS resolution, space charge induced mass or resolution shift, mass calibration or IMS calibration.

According to an embodiment there is provided a method of controlling the intensity of a signal.

According to an embodiment there is provided a method of mass spectrometry comprising:

recording a current data set at a first time period;

comparing the current data set with one or more previously recorded data sets or comparing one or more previously recorded data sets and based on the comparison predicting the expected intensity of a subsequent data set not yet recorded;

calculating a change to one or more operating parameters of the mass spectrometer such that the intensity of the subsequent data set will not exceed a predetermined intensity; and recording the subsequent data set using the adjusted operating parameter.

The method preferably includes storing the values of intensity, operating parameter and attenuation factor of previously acquired data.

The intensity data is preferably rescaled based on the change in or value of said operating parameter.

The operating parameter changed is preferably transmission of the mass spectrometer, efficiency of ionisation, gain of the ion detection system, duty cycle of the mass spectrometer, fill time of an ion trap, adjustment of the extent of fragmentation of ions or fluence or power of a laser or other excitation source.

The comparison preferably involves calculating the rate of change of the intensity based on the current and previously recorded data or a subset of the previously recorded data alone.

The intensity is preferably defined as the total ion current/sum of all intensities within the spectrum, a known portion of the total ion current, ion current or sum of intensities within predefined separated region or regions or the maximum height of signal within a predefined region or regions.

The data is preferably either a mass spectrum, 2D mass to charge ratio, an ion mobility separation ("IMS") drift time data set or an ion mobility separation ("IMS") spectrum.

According to an embodiment the mass spectrometer may further comprise:

(a) an ion source selected from the group consisting of: (i) an Electrospray ionisation ("ESI") ion source; (ii) an Atmospheric Pressure Photo Ionisation ("APPI") ion source; (iii) an Atmospheric Pressure Chemical Ionisation ("APCI") ion source; (iv) a Matrix Assisted Laser Desorption Ionisation ("MALDI") ion source; (v) a Laser Desorption Ionisation ("LDI") ion source; (vi) an Atmospheric Pressure Ionisation ("API") ion source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") ion source; (xi) a Field Desorption ("FD") ion source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption Ionisation ion source; (xviii) a Thermospray ion source; (xix) an Atmospheric Sampling Glow Discharge Ionisation ("ASGDI") ion source; (xx) a Glow Discharge ("GD") ion source; (xxi) an Impactor ion source; (xxii) a Direct Analysis in Real Time ("DART") ion source; (xxiii) a Laserspray Ionisation ("LSI") ion source; (xxiv) a Sonicspray Ionisation ("SSI") ion source; (xxv) a Matrix Assisted Inlet Ionisation ("MAII") ion source; (xxvi) a Solvent Assisted Inlet Ionisation ("SAII") ion source; (xxvii) a Desorption Electrospray Ionisation ("DESI") ion source; and (xxviii) a Laser Ablation Electrospray Ionisation ("LAESI") ion source; and/or (b) one or more continuous or pulsed ion sources; and/or
(c) one or more ion guides; and/or
(d) one or more ion mobility separation devices and/or one or more Field Asymmetric Ion Mobility Spectrometer devices; and/or
(e) one or more ion traps or one or more ion trapping regions; and/or
(f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic mass analyser arranged to generate an electrostatic field having a quadro-logarithmic potential distribution; (x) a Fourier Transform electrostatic mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analysers or electrostatic energy analysers; and/or
(i) one or more ion detectors; and/or
(j) one or more mass filters selected from the group consisting of: (i) a quadrupole mass filter; (ii) a 2D or linear quadrupole ion trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or
(k) a device or ion gate for pulsing ions; and/or
(l) a device for converting a substantially continuous ion beam into a pulsed ion beam.

The mass spectrometer may further comprise either:
(i) a C-trap and a mass analyser comprising an outer barrel-like electrode and a coaxial inner spindle-like electrode that form an electrostatic field with a quadro-logarithmic potential distribution, wherein in a first mode of operation ions are transmitted to the C-trap and are then injected into the mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the mass analyser; and/or (ii) a stacked ring ion guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of: (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of: (i) <100 kHz; (ii) 100-200 kHz; (iii) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi)

8.0-8.5 MHz; (xxii) 8.5-9.0 MHz; (xxiii) 9.0-9.5 MHz; (xxiv) 9.5-10.0 MHz; and (xxv) >10.0 MHz.

The mass spectrometer may also comprise a chromatography or other separation device upstream of an ion source. According to an embodiment the chromatography separation device comprises a liquid chromatography or gas chromatography device. According to another embodiment the separation device may comprise: (i) a Capillary Electrophoresis ("CE") separation device; (ii) a Capillary Electrochromatography ("CEC") separation device; (iii) a substantially rigid ceramic-based multilayer microfluidic substrate ("ceramic tile") separation device; or (iv) a supercritical fluid chromatography separation device.

The ion guide is preferably maintained at a pressure selected from the group consisting of: (i) <0.0001 mbar; (ii) 0.0001-0.001 mbar; (iii) 0.001-0.01 mbar; (iv) 0.01-0.1 mbar; (v) 0.1-1 mbar; (vi) 1-10 mbar; (vii) 10-100 mbar; (viii) 100-1000 mbar; and (ix) >1000 mbar.

BRIEF DESCRIPTION OF THE DRAWINGS

Various embodiments of the present invention will now be described, by way of example only, and with reference to the accompanying drawings in which.

DETAILED DESCRIPTION OF PREFERRED EMBODIMENTS

A preferred embodiment of the present invention will now be described with reference to FIG. 1. The preferred embodiment relates to a method used to control the intensity of a target region of data such that the intensity does not exceed a predefined level and cause saturation of an ion detector or an ion detection system.

Figure 1:
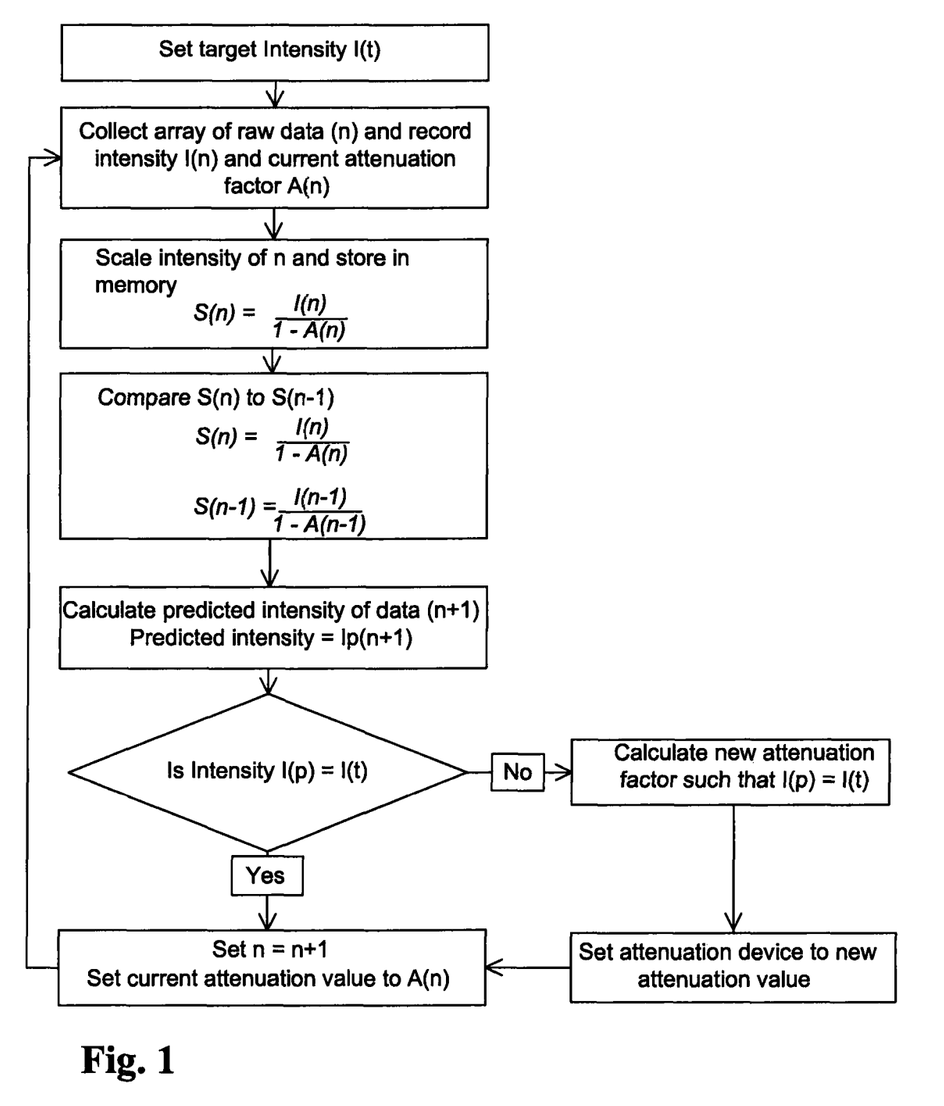
FIG. 1 shows a flow chart illustrating a preferred embodiment of the present invention.

FIG. 1 shows a flow chart illustrating a preferred embodiment of the present invention. It is assumed in this flow diagram that at least two data sets have been recorded.

Initially, a target intensity value I(t) is set. This is preferably a fixed percentage lower than a maximum value of intensity which can be accommodated. For example, if an Analogue to Digital ("ADC") recording system has a maximum intensity which can be recorded without saturation of X, then I(t) may be set to 0.7X. This ensures that most of the recorded data is below the maximum allowable intensity. Similarly, if the limit of the maximum number of charges to be introduced into an ion trap is Y, then I(t) may be set to 0.7Y. Other ratios may be chosen.

An array of data is then recorded. This data is preferably given an index number (n). The intensity I(n) or charge density within a specific range of the data set or ranges is then preferably recorded or measured. The value of the current attenuation factor is also recorded. For example, the previous data may have been attenuated to 20% of its unattenuated value by an attenuation device. In this case the attenuation factor is 0.8. This may correspond to attenuation in transmission, a drop in the ion detector gain or a change in the fill time of an ion trap from a maximum value.

The intensity of the data I(n) is then rescaled using the attenuation factor A(n) and recorded to disk and is optionally presented to the user:

$$S(n) = \frac{I(n)}{1 - A(n)} \quad (1)$$

This value is also preferably stored in memory so that it can be used subsequently within a feedback routine.

The scaled value S(n) may then be compared to a scaled intensity value already stored in memory from a previously acquired array of data S(n−1) where:

$$S(n-1) = \frac{I(n-1)}{1 - A(n-1)} \quad (2)$$

This comparison is preferably used to calculate a predicted intensity for a subsequent array of data which has not yet been recorded. In FIG. 1 the current data set (n) and a previous data set (n−1) are used to predict a value for a subsequent data set (n+1). The predicted intensity is Ip(n+1).

The simplest method to predict a subsequent intensity is to perform a linear extrapolation using S(n) and S(n−1) and the times at which they were recorded and the time at which the next data array will be recorded. This assumes that the intensity will change in a linear fashion over the local region of data (n−1) to (n+1). More complex prediction methods may be used depending on the nature of the data.

In some cases it may be more practical or appropriate to use data more remote from the current data array (n) to predict the behaviour of the intensity for subsequent data. For example, S(n−2) and S(n−1) may be used to predict S(n+1). In addition, more than two scaled intensity values can be used to predict a subsequent intensity value.

Once the predicted intensity I(p) value has been calculated it can be compared to the target value I(t). If I(p)=I(t) then the attenuation device can remain unchanged. If not then a new value of attenuation can be calculated such that I(p)=I(t).

The attenuation device is then preferably altered so that this value of attenuation is achieved.

The method described above preferably calculates a precise predicted value of attenuation to apply. It is more preferable to choose a limited array of allowed attenuation values to use. This restricts the minimum amount that the attenuation device will be changed and restricts the minimum attenuation value which can be applied. This will prevent very small changes in the attenuation value being made between every data point and can improve the stability of the preferred embodiment to fluctuation due to statistical variation or noise.

In addition, it is preferable to further stabilise the preferred method by restricting the maximum amount by which the attenuation can be changed. This will prevent the preferred method from oscillating or becoming unstable if the signal becomes unstable or if extremely rapid unexpected changes in intensity occur.

Once the attenuation device has been set to its new value, the index can be reset such that the next set of data to be acquired at the new attenuation value becomes I(n) and the new attenuation value set becomes A(n).

The procedure then preferably repeats until the end of the acquisition.

Other modifications to this general procedure can improve the effectiveness of the preferred method without deviation from the essence of the invention. For example, it may be preferable to predict subsequent intensity as the intensity increases but to base the attenuation factor solely on the current data array (n) when the intensity is decreasing. This can help to prevent under attenuation in cases where there is a point of inflection or a valley in the intensity profile. Using the method described it is recognised that there may be some over correction at the point of inflection of the intensity at the peak of the intensity. However, the preferred method will preferably always keep the data below the desired intensity threshold.

Figure 2:
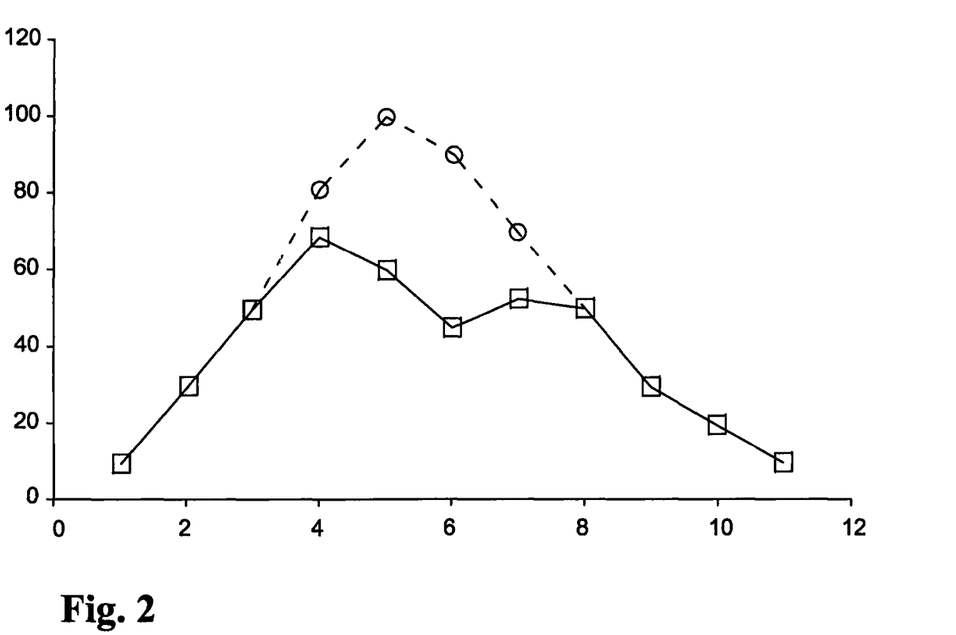
FIG. 2 shows a plot of intensity versus scan number.

FIG. 2 shows an example of the method shown in FIG. 1 applied to an example set of data. FIG. 2 shows a plot of intensity I(n) versus scan number (n). The threshold I(t) was set at an intensity of 60 to control the signal below an intensity of 72. In this case I(t) was set to 80% of the maximum allowable intensity.

Attenuation values were limited to integer percentage values i.e. 99%, 98% . . . 1%. A linear extrapolation based on the scaled intensity values was used to calculate the predicted intensity.

The dashed line shows the data after rescaling. This is identical to the input data used. The solid line shows the attenuated data before rescaling. It is apparent that the preferred method controls the signal within the limits specified.

Figure 3:
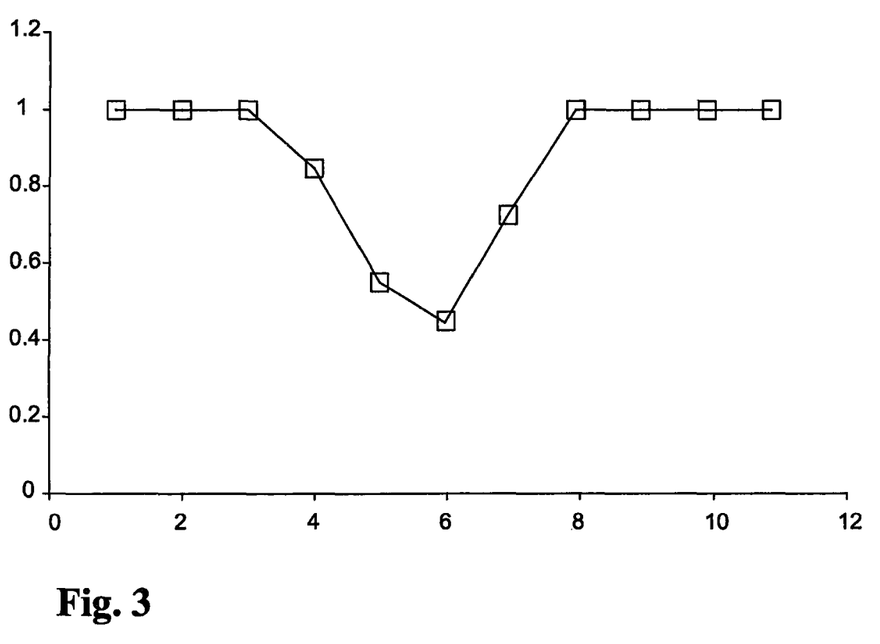
FIG. 3 shows a corresponding plot of attenuation factor versus scan number.

FIG. 3 shows a plot of attenuation factor versus scan number for the example shown in FIG. 2.

In some cases the method of attenuation may require the relationship between the attenuation factor and the magnitude of the operating parameter adjusted to be calibrated. This relationship can be used in the calculation of required adjustment. For example, the detector voltage typically has a non linear relationship to detector gain and therefore this relationship must be calculated and used during any extrapolation.

The method may be used to control the intensity of a targeted region of multi dimensional data sets such as ion mobility-mass spectrometry ("IMS-MS") data.

The method of data dependent control may be used to control intensity for other reasons than the dynamic range or saturation characteristics of the detection system. For example, limiting space charge effects in ion traps and ion mobility separation ("IMS") devices, controlling maximum data rates through downstream high speed electronics, limiting the output current of an ion detector to extend the operational lifetime of said detector, controlling the build-up of contamination or 'ion burn' on lens elements of the mass spectrometer which require routine cleaning to ensure optimum performance and hence extending the operational lifetime of a system.

Although the preferred embodiment as described above is concerned with intensity variations with time, such as in chromatographic applications, other embodiments are contemplated wherein the intensity variation is in space. For example, in a Matrix Assisted Laser Desorption Ionisation ("MALDI") imaging application a particular region of a target surface may contain a high concentration of analyte or give a very high ion response. It may be desirable to control the intensity of the signal produced in these regions by attenuating the ion beam in a similar manner to that described.

In this case the intensity may be recorded at laser or target positions in (x,y) coordinates. Two or more data points in a local area may be used to predict the expected intensity of and hence the attenuation required for a target position or target positions not yet acquired. As this type of imaging produces a two dimensional map of the target surface methods which use prediction in both dimensions simultaneously may be appropriate. In this application the data used to predict a subsequent data point may not be acquired sequentially in time.

Other types of imaging techniques such as Desorption Electrospray Ionisation ("DESI") and Laser Ablation Electrospray Ionisation ("LAESI") can also benefit from this approach.

Characteristics of the data other than intensity may be monitored and used to adjust the operating parameters of the mass spectrometer to maintain other aspects of performance.

For example, the width of a mass spectral peak may change as the intensity of the signal exceeds the dynamic range of the detection system. This characteristic may be recorded and the trend observed in previously acquired data used to predict the width in a subsequent data set. The intensity of the signal may then be adjusted to maintain the width at a predetermined limit.

Various other such characteristics are also contemplated.

Characteristics other than intensity may be predicted and varied. For example, if the mass to charge ratio drift with time is monitored during an experiment at regular intervals by using an external lock mass it is possible to use stored mass to charge ratio data from the lock mass to predict the amount a subsequent data set or several data sets may have drifted in mass to charge ratio. These predicated mass to charge ratio corrections may be made to the subsequent data sets prior to acquiring the data. This method allows calibration corrections to the data to be made as the acquisition proceeds (in real time) in the intervals between times at which the external lock mass check is performed. This can improve the overall mass accuracy of the experiment.

If the lock mass intensity is changing with time, then the lock mass acquisition time may be changed such that sufficient data is acquired to ensure the precision of the lock mass measurement remains within a predetermined range. Alternatively, the intensity of the lock mass peak may be monitored and adjusted by the method previously described. Prediction and correction for mass to charge ratio drift and intensity drift etc. may be made at the same time.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:
   (i) obtaining first intensity data at a first time or location and second intensity data at a second subsequent time or location;
   (ii) predicting a future trend or rate of change of intensity of a signal delivered to a mass spectrometer from said first and second intensity data, wherein said mass spectrometer comprises an attenuation device; and
   (iii) adjusting the transmission of ions by adjusting an attenuation factor of said attenuation device in response to said predicted future trend or rate of change so as to: limit space charge effects in an ion trap or ion mobility separation device; or control the build-up of contamination on a lens element of the mass spectrometer; or control the maximum data rate through downstream high speed electronics.

2. A method as claimed in claim 1, wherein said first and second intensity data comprise mass spectral data.

3. A method as claimed in claim 1, wherein said first and second intensity data comprise multi-dimensional data.

4. A method as claimed in claim 3, wherein said first and second intensity data relate to two or more physico-chemical properties of ions.

5. A method as claimed in claim 4, wherein said two or more physico-chemical properties comprise mass, mass to charge ratio, time of flight, ion mobility, differential ion mobility, retention time, liquid chromatography retention time, gas chromatography retention time or capillary electrophoresis retention time.

6. A mass spectrometer comprising:
an attenuation device;
a control system arranged and adapted:
(i) to obtain first intensity data at a first time or location and second intensity data at a second subsequent time or location;
(ii) to predict a future trend or rate of change of intensity of a signal delivered to the mass spectrometer from said first and second intensity data; and
(iii) to adjust the transmission of ions by adjusting an attenuation factor of said attenuation device in response to said predicted future trend or rate of change so as to: limit space charge effects in an ion trap or ion mobility separation device of mass the spectrometer; or control the build-up of contamination on a lens element of the mass spectrometer; or control the maximum data rate through downstream high speed electronics of the spectrometer.

7. A mass spectrometer as claimed in claim 6, wherein said first and second intensity data comprise mass spectral data.

8. A mass spectrometer as claimed in claim 6, wherein said first and second intensity data comprise multi-dimensional data.

9. A mass spectrometer as claimed in claim 8, wherein said first and second intensity data relate to two or more physico-chemical properties of ions.

10. A mass spectrometer as claimed in claim 9, wherein said two or more physico-chemical properties comprise mass, mass to charge ratio, time of flight, ion mobility, differential ion mobility, retention time, liquid chromatography retention time, gas chromatography retention time or capillary electrophoresis retention time.

11. A method as claimed in claim 1, wherein the method comprises repeating steps (i)-(iii) throughout an acquisition cycle.

12. A method as claimed in claim 1, wherein the step of adjusting said attenuation factor comprises using an attenuation factor from a limited array of allowed attenuation factors.

13. A method as claimed in claim 1, wherein the step of adjusting the transmission of ions by adjusting an attenuation factor of said attenuation device comprises restricting the maximum amount by which said attenuation factor can be changed.

14. A method as claimed in claim 1, wherein the step of adjusting the transmission of ions by adjusting an attenuation factor of said attenuation device comprises repeatedly switching said attenuation device between a first mode of operation for a first time period wherein the ion transmission is substantially zero and a second mode of operation for a second time period wherein the ion transmission is greater than substantially zero.

15. A method as claimed in claim 14, wherein the step of adjusting the transmission of ions by adjusting an attenuation factor of said attenuation device comprises adjusting the mark space ratio in order to adjust or vary the transmission or attenuation of the attenuation device, wherein said mark space ratio is the ratio of said second time period with respect to said first time period.

16. A mass spectrometer as claimed in claim 6, wherein said control system is arranged and adapted to repeat steps (i)-(iii) throughout an acquisition cycle.

* * * * *